(12) United States Patent
Zhang et al.

(10) Patent No.: US 12,322,374 B2
(45) Date of Patent: Jun. 3, 2025

(54) PHRASE-BASED END-TO-END TEXT-TO-SPEECH (TTS) SYNTHESIS

(71) Applicant: Microsoft Technology Licensing, LLC, Redmond, WA (US)

(72) Inventors: Ran Zhang, Redmond, WA (US); Jian Luan, Beijing (CN); Yahuan Cong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 17/919,982

(22) PCT Filed: Mar. 19, 2021

(86) PCT No.: PCT/US2021/023054
§ 371 (c)(1),
(2) Date: Oct. 19, 2022

(87) PCT Pub. No.: WO2021/242366
PCT Pub. Date: Dec. 2, 2021

(65) Prior Publication Data
US 2023/0169953 A1   Jun. 1, 2023

(30) Foreign Application Priority Data
May 26, 2020   (CN) .......................... 202010460593.5

(51) Int. Cl.
*G10L 13/08*   (2013.01)
*G10L 13/04*   (2013.01)

(52) U.S. Cl.
CPC .............. *G10L 13/08* (2013.01); *G10L 13/04* (2013.01)

(58) Field of Classification Search
USPC ........................................ 704/258, 231, 235
See application file for complete search history.

(56) References Cited

U.S. PATENT DOCUMENTS 7,010,489 B1 * 3/2006 Lewis ..................... G10L 13/10
                                                                704/260
10,475,438 B1 * 11/2019 Chicote ................. G10L 13/033
(Continued)

FOREIGN PATENT DOCUMENTS

CN         101894547 A       11/2010
CN         102651217 A        8/2012
(Continued)

OTHER PUBLICATIONS

"Second Office Action Issued in Chinese Patent Application No. 202010460593.5", Mailed Date: Sep. 28, 2023, 19 Pages.
(Continued)

*Primary Examiner* — Leonard Saint-Cyr
(74) *Attorney, Agent, or Firm* — Schwegman Lundberg & Woessner, P.A.

(57) ABSTRACT

The present disclosure provides methods and apparatuses for phrase-based end-to-end text-to-speech (TTS) synthesis. A text may be obtained. A target phrase in the text may be identified. A phrase context of the target phrase may be determined. An acoustic feature corresponding to the target phrase may be generated based at least on the target phrase and the phrase context. A speech waveform corresponding to the target phrase may be generated based on the acoustic feature.

13 Claims, 7 Drawing Sheets

(56) References Cited

U.S. PATENT DOCUMENTS

| | | | |
|---|---|---|---|
| 2006/0074677 A1* | 4/2006 | DeSimone | G10L 13/10 |
| | | | 704/E13.013 |
| 2022/0020355 A1* | 1/2022 | Ming | G10L 13/06 |

FOREIGN PATENT DOCUMENTS

| | | |
|---|---|---|
| CN | 109697973 A | 4/2019 |
| CN | 110050302 A | 7/2019 |
| CN | 110634466 A | 12/2019 |
| JP | 2003302992 A | 10/2003 |

OTHER PUBLICATIONS

"Office Action Issued in European Patent Application No. 21718348. 2", Mailed Date: Oct. 23, 2023, 4 Pages.

Notice of Grant Received for Chinese Application No. 202010460593. 5, mailed on Nov. 28, 2023, 7 pages.

"CRF++: Yet Another CRF toolkit", Retrieved from: https://taku910.github.io/crfpp/, Retrieved Date: Dec. 7, 2022, 10 Pages.

Arik, "Fast spectrogram inversion using multi-head convolutional neural networks", In IEEE Signal Processing Letters, vol. 26, Issue 1, Nov. 9, 2018, pp. 94-98.

Cho, et al., "Learning Phrase Representations using RNN Encoder—Decoder for Statistical Machine Translation", In Proceedings of Conference on Empirical Methods in Natural Language Processing, Oct. 25, 2014, pp. 1724-1734.

Gonzalvo, et al., "Recent advances in google real-time hmm-driven unit selection synthesizer", In Proceedings of Interspeech 2016, Sep. 8, 2016, pp. 2238-2242.

Hayashi, et al., "Pre-Trained Text Embeddings for Enhanced Text-to-Speech Synthesis", Retrieved From: https://www.isca-speech.org/archive/Interspeech_2019/pdfs/3177.pdf, Jan. 1, 2019, pp. 4430-4434.

Hochreiter, et al., "Long short-term memory", In Journal of Neural computation, vol. 9, Issue 8, Nov. 15, 1997, pp. 1735-1780.

Ioffe, et al., "Batch Normalization: Accelerating Deep Network Training by Reducing Internal Covariate Shift", In Proceedings of the 32nd International Conference on Machine Learning, Jul. 6, 2015, pp. 1-11.

Li, et al., "Close to Human Quality TTS with Transfomer", In repository of arxiv code:1809.08895v2 [cs.CL], Nov. 13, 2018, 8 Pages.

Luan, J., "Expand CRF to model long distance dependencies in prosodic break prediction", In Proceedings of Interspeech, Sep. 9, 2012, pp. 2530-2533.

Oord, et al., "Parallel wavenet: Fast high-fidelity speech synthesis.", In Proceedings of the 35th International Conference on Machine Learning, Jan. 2018, 9 Pages.

Oord, et al., "WaveNet: A Generative Model for Raw Audio", In Repository of arXiv:1609.03499, Sep. 19, 2016, 15 Pages.

"International Search Report and Written Opinion Issued in PCT Application No. PCT/US21/023054", Mailed Date: Jun. 29, 2021, 11 Pages.

Ping, et al., "ClariNet: Parallel Wave Generation in End-to-End Text-to-Speech", In Repository of arXiv:1807.07281v1, Jul. 19, 2018, 12 Pages.

Ping, et al., "Deep Voice 3: 2000-speaker neural text-to-speech", In Proceedings of International Conference on Learning Representations, Feb. 22, 2018, 16 Pages.

Prenger, et al., "Waveglow: A flow-based generative network for speech synthesis", In IEEE International Conference on Acoustics, Speech and Signal Processing (ICASSP), May 12, 2019, pp. 3617-3621.

Qian, et al., "Automatic Prosody Prediction and Detection with Conditional Random Field (CRF) Models", In 7th International Symposium on Chinese Spoken Language Processing, Nov. 29, 2010, pp. 135-138.

Ren, et al., "Fastspeech: Fast, robust and controllable text to speech", In Proceedings of the 33rd Conference on Neural Information Processing Systems, Dec. 8, 2019, 10 Pages.

Schuster, et al., "Bidirectional recurrent neural networks", In the Journal of IEEE Transactions on Signal Processing, vol. 45, Issue 11, IEEE Transactions on Signal Processing, vol. 45, Issue 11, Nov. 11, 1997, pp. 2673-2681.

Shen, et al., "Natural TTS Synthesis by Conditioning Wavenet on MEL Spectrogram Predictions", In Proceedings of International Conference on Acoustics, Speech and Signal Processing, Apr. 15, 2018, pp. 4779-4783.

Skerry-Ryan, et al., "Towards End-to-End Prosody Transfer for Expressive Speech Synthesis with Tacotron", https://arxiv.org/abs/1803.09047, Mar. 2018, 11 Pages.

Tokuda, et al., "Speech Synthesis Based on Hidden Markov Models", In Proceedings of the IEEE vol. 101, Issue 5, May 2013, pp. 1234-1252.

Vaswani, et al., "Attention Is All You Need", In Proceedings of 31st Conference on Neural Information Processing Systems, Dec. 4, 2017, 11 Pages.

Wang, et al., "Investigation of Using Continuous Representation of Various Linguistic Units in Neural Network Based Text-to-Speech Synthesis", In Journal of IEICE transactions on information and systems, vol. E99.D, Issue 10, Jan. 1, 2016, 10 Pages.

Wang, et al., "Tacotron: Towards End-to-End Speech Synthesis", In Proceedings of 18th Annual Conference of the International Speech Communication Association, Aug. 20, 2017, pp. 4006-4010.

Wang, et al., "Style tokens: Unsupervised style modeling control and transfer in end-to-end speech synthesis", In repository of arxiv code: 1803.09017v1 [cs.CL], Mar. 23, 2018, 11 Pages.

Yahuan, et al., "PPSpeech: Phrase based Parallel End-to-End TTS System", In Repository of arXiv:2008.02490, Aug. 6, 2020, 5 Pages.

Zen, et al., "Fast, Compact, and High Quality LSTM-RNN Based Statistical Parametric Speech Synthesizers for Mobile Devices", In Proceedings of Interspeech, Jun. 22, 2016, 5 Pages.

Zen, et al., "Statistical Parametric Speech Synthesis", In Speech Communication, vol. 51, No. 11, Nov. 1, 2009, 26 Pages.

Zhang, et al., "Learning Latent Representations for Style Control and Transfer in End-to-end Speech Synthesis", In Proceedings of IEEE International Conference on Acoustics, Speech and Signal Processing, May 12, 2019, pp. 6945-6949.

"Office Action Issued in Chinese Patent Application No. 202010460593. 5", Mailed Date: Feb. 17, 2023, 19 Pages.

* cited by examiner

PHRASE-BASED END-TO-END TEXT-TO-SPEECH (TTS) SYNTHESIS

CROSS-REFERENCE TO RELATED APPLICATION

This application is a U.S. National Stage Filing under 35 U.S.C. 371 of International Patent Application Serial No. PCT/US2021/023054, filed Mar. 19, 2021, and published as WO 2021/242366 A1 on Dec. 2, 2021, which application claims the benefit of priority to Chinese Patent Application No. 202010460593.5, filed May 26, 2020, which applications and publication are incorporated herein by reference in their entirety.

BACKGROUND

Text-to-speech (TTS) synthesis directs to generating corresponding speech waveforms based on text inputs. A conventional end-to-end TTS system may predict an acoustic feature based on a text input, and further generate a speech waveform based on the predicted acoustic feature.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose methods and apparatuses for phrase-based end-to-end text-to-speech (TTS) synthesis. A text may be obtained. A target phrase in the text may be identified. A phrase context of the target phrase may be determined. An acoustic feature corresponding to the target phrase may be generated based at least on the target phrase and the phrase context. A speech waveform corresponding to the target phrase may be generated based on the acoustic feature.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
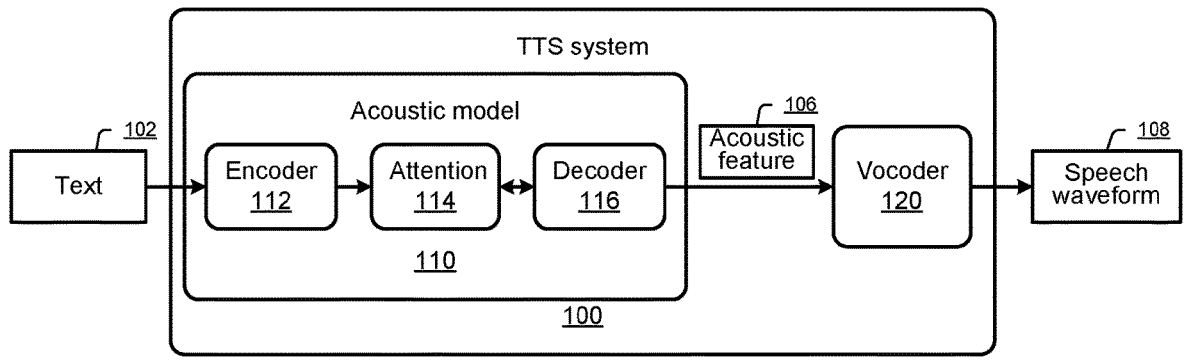
FIG. 1 illustrates an exemplary conventional end-to-end TTS system.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Deep neural network-based systems have become more and more popular for TTS tasks. Usually, these systems generate acoustic features, such as Mel spectrogram features, autoregressively from text inputs at a sentence level, and synthesize speech based on the acoustic features through a vocoder. Compared with non-autoregressive sequence generating approaches, these end-to-end autoregressive TTS systems may improve the quality of synthesized speech. However, due to the autoregressive nature, these systems have a slow speed of speech synthesis, and thus will face a great challenge when providing online services. Moreover, the style of the synthesized speech may be unstable and may change obviously among sentences, and these systems lack effective control over style or prosody. Although some non-autoregressive speech synthesis may improve the speed of speech synthesis, there is still a gap between the quality of the speech generated by the non-autoregressive approach and that of the autoregressive approach.

Embodiments of the present disclosure propose phrase-based end-to-end TTS synthesis. Herein, phrases may refer to language elements constituting a sentence, which are identified by performing phrase division on the sentence. A sentence may include one or more phrases, and each phrase may include one or more words, characters, etc.

In one aspect, the embodiments of the present disclosure may perform speech synthesis in parallel at a phrase level. The autoregressive approach is still adopted within each phrase for generating speech, so as to ensure high speech quality and naturalness. A parallel strategy may be applied among different phrases to generate corresponding speeches for a plurality of different phrases in parallel or synchronously, thereby significantly improving the efficiency of speech synthesis and shortening the overall time of speech synthesis.

In one aspect, the embodiments of the present disclosure may consider a phrase context in speech synthesis. The phrase context may comprise, e.g., a previous phrase, a subsequent phrase, etc. adjacent to the current phrase. In some implementations, a context embedding representation corresponding to the phrase context may be used as a condition of an acoustic model in a TTS system, so as to affect the generation of acoustic features. Through considering the phrase context in speech synthesis, prosody coordination may be maintained among phrases in a sentence, and smooth prosody across sentences may be further achieved. Herein, the prosody may broadly include, e.g., tone, intonation, rate, accent, etc.

In one aspect, the embodiments of the present disclosure may consider a reference audio with a target style in speech synthesis. Herein, the style may broadly refer to a speaking style adopted by a synthesized speech, e.g., lecture style, news broadcasting style, storytelling style, etc. In some implementations, an acoustic embedding representation corresponding to the reference audio may be used as a condition of the acoustic model, so as to affect the generation of acoustic features. Through considering the reference audio in speech synthesis, style control may be achieved in a more stable approach, so that the synthesized speech maintains a unified style within a sentence and among different sentences, has a natural style transition, has no abrupt change in style or timbre, etc.

According to the embodiments of the present disclosure, through synthesizing speech in parallel at a phrase level, efficient and fast speech synthesis may be achieved. Through considering a phrase context and/or a reference audio in speech synthesis, e.g., using a context embedding representation and/or an acoustic embedding representation as conditions of speech synthesis, the prosody and/or style of the synthesized speech may be effectively controlled, so that the synthesized speech is more natural and expressive, and does not have abrupt change in style or timbre.

FIG. 1 illustrates an exemplary conventional end-to-end TTS system 100.

The TTS system 100 may be configured for receiving a text 102, and generating a speech waveform 108 corresponding to the text 102. It should be understood that although the text 102 is shown in FIG. 1 as provided to the TTS system 100, the text 102 may be first converted into a phoneme sequence, and then the phoneme sequence may be provided to the TTS system 100 as an input. Herein, the input "text" may broadly refer to a text sentence, or a phoneme sequence obtained from the text.

The TTS system 100 may include an acoustic model 110. The acoustic model 110 may predict or generate an acoustic feature 106 according to the text 102. The acoustic feature 106 may include various TTS acoustic features, e.g., Mel spectrogram, linear spectral pair (LSP), etc. The acoustic model 110 may be based on various model architectures. The exemplary acoustic model 110 shown in FIG. 1 may be based on, e.g., Tacotron technique, which comprises an encoder 112, an attention module 114, and a decoder 116.

The encoder 112 may convert information contained in the text 102 into a space that is more robust and more suitable for learning alignment with acoustic features. For example, the encoder 112 may convert the information in the text 102 to a state sequence in the space, which may also be referred as encoder states or an encoder state sequence. Each state in the encoder state sequence corresponds to a phoneme, a grapheme, etc. in the text 102.

The attention module 114 may implement an attention mechanism. The attention mechanism establishes connection between the encoder 112 and the decoder 116, to facilitate aligning between text features output by the encoder 112 and acoustic features. For example, connection between each decoding step and encoder states may be established, and the connection may indicate each decoding step should correspond to which encoder state with what weight. The attention module 114 may take the encoder state sequence and an output of the previous step of the decoder as inputs, and generate an attention vector that represents a weight for the next decoding step to align with each encoder state.

The decoder 116 may map the encoder state sequence output by the encoder 112 to the acoustic feature 106 under the influence by the attention mechanism in the attention module 114. At each decoding step, the decoder 116 may take the attention vector output by the attention module 114 and an output of the previous step of the decoder as inputs, and output an acoustic feature of one or more frames, e.g., Mel spectrogram.

The TTS system 100 may include a vocoder 120. The vocoder 120 may generate the speech waveform 108 based on the acoustic feature 106 predicted by the acoustic model 110.

It should be understood that FIG. 1 only shows an exemplary end-to-end TTS system, and there may exist various other types of end-to-end TTS system. For example, instead of an acoustic model that is based on Tacotron technique, the acoustic model 110 may also be based on any other techniques, e.g., Long Short Term Memory (LSTM) network, FastSpeech, etc. Moreover, the vocoder 120 may also be based on various techniques, e.g., WaveNet, WageGlow, etc.

Figure 2:
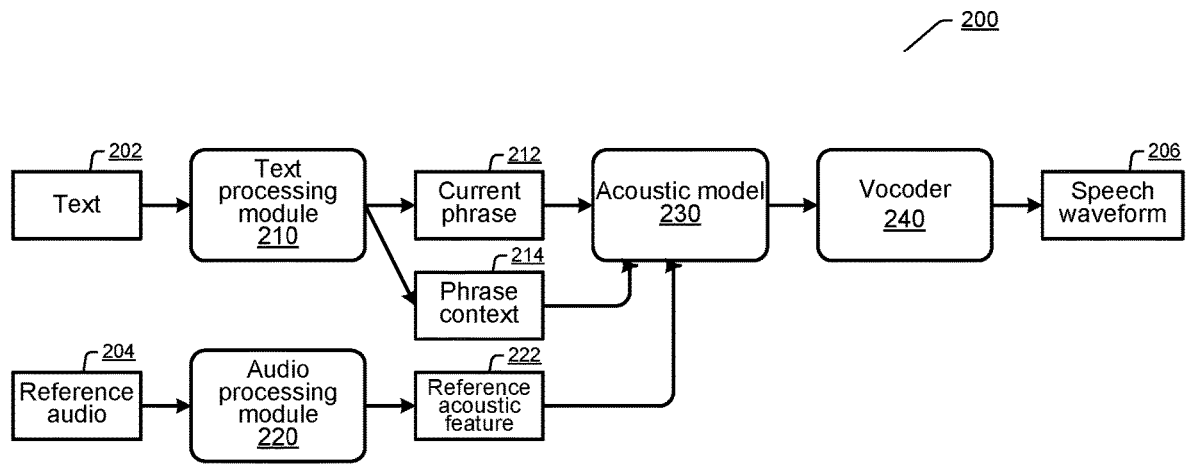
FIG. 2 illustrates an exemplary process of phrase-based end-to-end TTS synthesis according to an embodiment.

FIG. 2 illustrates an exemplary process 200 of phrase-based end-to-end TTS synthesis according to an embodiment. It is assumed that, in the process 200, it is desired to generate a speech waveform corresponding to a text 202. The text 202 may include, e.g., one or more sentences.

According to the process 200, a target phrase to be processed may be identified from the text 202. In an implementation, phrase division may be performed on the text 202 through, e.g., a text processing module 210, to divide the text 202 into a plurality of phrases. The target phrase may be extracted from the plurality of obtained phrases. The target phrase may also be referred to as the current phrase, which represents the phrase currently being processed by the process 200. It is assumed that the current phrase 212 is identified through the text processing module 210. It should be understood that, according to specific application requirements and designs, the current phrase 212 may include one or more phrases.

According to the process 200, a phrase context of the target phrase may also be determined. For example, a phrase context 214 of the current phrase 212 may be determined through the text processing module 210. The phrase context 214 may refer to context information at a phrase level, e.g., one or more previous phrases adjacent to the current phrase 212, one or more subsequent phrases adjacent to the current phrase 212, etc. Phrases in the phrase context 214 may be extracted from the plurality of phrases included in the text 202.

As an example, it is assumed that the text 202 is divided into 7 phrases in the order of "<phrase 1>, <phrase 2>, <phrase 3>, <phrase 4>, <phrase 5>, <phrase 6>, <phrase 7>". Assuming that <phrase 4> is extracted as the current phrase 212, the phrase context 214 may include, e.g., the previous phrase <phrase 3>, the subsequent phrase <phrase 5>, etc. Assuming that <phrase 4, phrase 5> is extracted as the current phrase 212, the phrase context 214 may include, e.g., the previous phrases <phrase 2, phrase 3>, the subsequent phrase <phrase 6>, etc.

In the process 200, an acoustic feature corresponding to the current phrase 212 may be generated based at least on the current phrase 212 and the phrase context 214. For example, an acoustic model 230 may be adopted for generating the acoustic feature. The acoustic model 230 may generate the acoustic feature in consideration of at least the phrase context 214. In one implementation, a context embedding representation corresponding to the phrase context 214 may be obtained, and the context embedding representation may be used as a condition for acoustic feature generation, e.g., as a condition input to the acoustic model 230. Therefore, the acoustic model 230 conditioned by the context embedding representation may implement the acoustic feature generation under the influence by the phrase context 214. Through this approach, the generated acoustic feature will facilitate to ensure coordination and consistency of speech prosody among different phrases.

A vocoder 240 may generate a speech waveform 206 corresponding to the current phrase 212 based on the acoustic feature.

Optionally, the process 200 may also implement style control by considering a reference audio in the process of acoustic feature generation, e.g., the acoustic model 230 may generate the acoustic feature corresponding to the current phrase 212 further based on a reference audio 204. The reference audio 204 may be obtained, which has a desired target style. For example, assuming that it is desired to generate speech with a storytelling style, the reference audio 204 adopting the storytelling style may be previously obtained. An acoustic embedding representation corresponding to the reference audio 204 may be generated, and the acoustic embedding representation may be used as a condition for acoustic feature generation, e.g., as a condition input to the acoustic model 230. Therefore, the acoustic model 230 conditioned by the acoustic embedding representation may implement the acoustic feature generation under the influence by the reference audio 204. Through this approach, the generated acoustic feature will facilitate to control the style of the generated speech. In an implementation, a reference acoustic feature 222 corresponding to the reference audio 204 may be generated first through an audio processing module 220. The audio processing module 220 may adopt any known techniques that can be used for extracting acoustic features from audio. Then, the acoustic embedding representation of the reference audio 204 may be generated based on the reference acoustic feature 222, which further serves as a condition input to the acoustic model 230.

It should be understood that although it is discussed above that the acoustic model 230 generates an acoustic feature in consideration of the phrase context 214 and generates an acoustic feature in consideration of the reference audio 204 respectively, the acoustic model 230 may also generate an acoustic feature in consideration of both the phrase context 214 and the reference audio 204. For example, both the context embedding representation of the phrase context 214 and the acoustic embedding representation of the reference audio 204 may be used as conditions of the acoustic model 230, so that the acoustic model 230 may control both prosody and style.

The above discussion only gives an exemplary process of phrase-based end-to-end TTS synthesis according to the embodiments of the present disclosure, and depending on specific application requirements and designs, the embodiments of the present disclosure may cover variations, extensions and modifications to the process 200 in any approaches. For example, FIG. 2 only shows the process of generating a speech waveform for one current phrase 212; however, in fact, the process 200 may be performed respectively on a plurality of target phrases in the text 202 in parallel, so as to synchronously generate a plurality of speech waveforms corresponding to these target phrases. For example, assuming that the text 202 includes 7 phrases, one instance of the process 200 may be applied to each phrase. Through performing the seven instances of the process 200 in parallel, seven speech waveforms corresponding to the seven phrases may be synchronously generated. A combination of these seven speech waveforms may be used as an entire speech waveform corresponding to the text 202. Through such phrase-level parallel strategy, the speed of speech synthesis may be significantly improved. Moreover, although FIG. 2 shows that the current phrase 212 and the phrase context 214 are provided to the acoustic model 230, depending on the specific implementation of the acoustic model 230, the current phrase 212 and the phrase context 214 may also be first converted into a current phrase phoneme sequence and a phrase context phoneme sequence, and then the current phrase phoneme sequence and the phrase context phoneme sequence may be provided to the acoustic model 230 as inputs. Moreover, the embodiments of the present disclosure are not limited to adopt a fixed reference audio 204, instead, different reference audios may also be adopted when performing speech synthesis for different texts, so as to achieve different timbres or speaking styles. Moreover, it should be understood that the embodiments of the present disclosure are not limited to any specific acoustic model, but may be applied to any acoustic model that can be conditioned by a context embedding representation of a phrase context and/or an acoustic embedding representation of a reference audio, e.g., an acoustic model that is based on Tacotron technique, an acoustic model that is based on LSTM, an acoustic model that is based on FastSpeech, etc. Moreover, the embodiments of the present disclosure are not limited to any specific vocoder, but may adopt various vocoders, e.g., WaveGlow, WaveNet, etc. Moreover, optionally, during the training phase, the reference audio 204 may be a real audio corresponding to the current phrase. Moreover, it should be understood that all or a part of the modules involved in the process 200 may be regarded as constituting an example of the phrase-based end-to-end TTS synthesis system according to the embodiments of the present disclosure.

Figure 3:
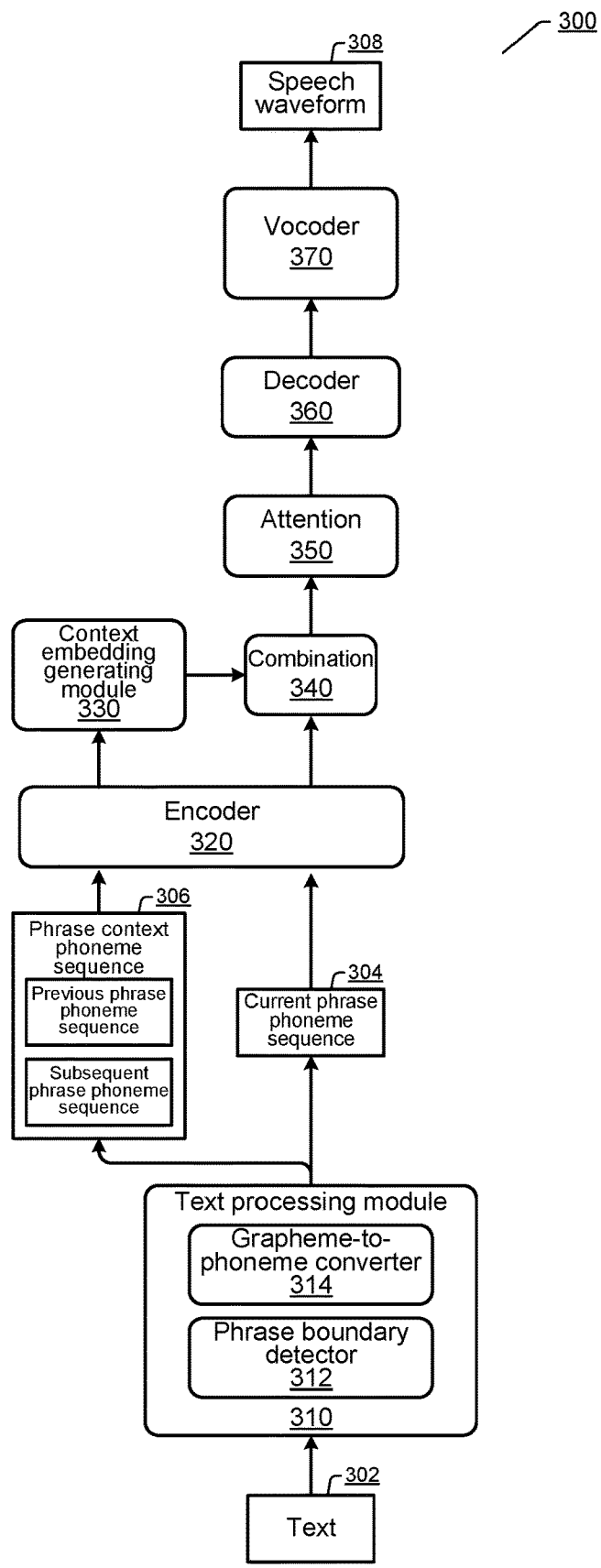
FIG. 3 illustrates an exemplary implementation of phrase-based end-to-end TTS synthesis according to an embodiment.

FIG. 3 illustrates an exemplary implementation 300 of phrase-based end-to-end TTS synthesis according to an embodiment. The implementation 300 is a specific example of the process 200 in FIG. 2. In the implementation 300, at least a phrase context is considered for speech synthesis.

A text 302 may be obtained. The implementation 300 is used for generating speech waveforms for phrases in the text 302.

The text 302 may be provided to a text processing module 310. The text processing module 310 may include a phrase boundary detector 312 for performing phrase division on the text 302 to obtain a plurality of phrases included in the text 302. The phrase boundary detector 312 may adopt any known techniques that can be used for dividing a text into phrases, e.g., Conditional Random Field (CRF), LSTM, etc. In the case that phrase division is performed through prosody break prediction, phrase division may be performed based on, e.g., intonation phrase (L3) break. Exemplarily, an expanded CRF model supporting dynamic features may be adopted for performing the task of L3 break prediction. The dynamic features adopted in the expanded CRF model may include, e.g., the number of words from the previous L3 break, the number of syllables from the previous L3 break, the part of speech of the word after the previous L3 break, the text of the word before the previous L3 break, the part of speech of the next word, whether the current word is followed by a punctuation, etc.

After identifying a plurality of phrases included in the text 302 via the phrase boundary detector 312, the current phrase and corresponding phrase context may be extracted from the plurality of phrases, wherein the phrase context may include the previous phrase and/or the subsequent phrase. The text processing module 310 may include a grapheme-to-phoneme converter 314 for obtaining pronunciation elements of each word. The grapheme-to-phoneme converter 314 may convert a grapheme sequence of the current phrase into a current phrase phoneme sequence 304, and convert a grapheme sequence of the phrase context into a phrase context phoneme sequence 306. The phrase context phoneme sequence 306 may include, e.g., a previous phrase phoneme sequence, a subsequent phrase phoneme sequence, etc.

The current phrase phoneme sequence 304 may be provided to an encoder 320 of an acoustic model in order to generate an encoder state corresponding to the current phrase phoneme sequence 304, which may also be referred to as a phrase embedding representation of the current phrase.

The phrase context phoneme sequence 306 may be provided to the encoder 320 of the acoustic model in order to generate an encoder state corresponding to the phrase context phoneme sequence 306, e.g., a previous phrase encoder state, a subsequent phrase encoder state, etc.

A context embedding generating module 330 may be used for generating a context embedding representation corresponding to the phrase context. For example, the context embedding generating module 330 may generate a context embedding representation based on the encoder state corresponding to the phrase context or the phrase context phoneme sequence 306. The context embedding representation may be provided to the acoustic model as a condition.

At 340, the context embedding representation and the phrase embedding representation may be combined to obtain a combined embedding representation. At 340, any combining approach may be adopted, e.g. concatenating, adding, etc. The processing by the context embedding generating module 330 may cause the sequence length of the context embedding representation to be compressed to, e.g., 1, therefore, optionally, before the combination at 340 is performed, expansion in a time dimension may be performed on the context embedding representation. Here, the time dimension may correspond to a sequence length. The context embedding representation may be expanded based on the time dimension of the phrase embedding representation of the current phrase. For example, assuming that the time dimension of the phrase embedding representation of the current phrase is L, the context embedding representation may be replicated for multiple times, so that a time dimension of the expanded context embedding representation is also L. Accordingly, at 340, the expanded context embedding representation and the phrase embedding representation of the current phrase may be combined into a combined embedding representation. It should be understood that the embodiments of the present disclosure are not limited to the combining approaches described above.

The combined embedding representation may be provided to an attention module 350 of the acoustic model. Furthermore, a decoder 360 of the acoustic model may generate an acoustic feature corresponding to the current phrase under an attention mechanism provided by the attention module 350.

A vocoder 370 may generate a speech waveform 308 corresponding to the current phrase based on the acoustic feature output by the acoustic model.

It should be understood that any process, module, etc. in the implementation 300 are exemplary, and depending on specific application requirements and designs, the embodiments of the present disclosure may cover variations, extensions and modifications to the implementation 300 in any approach. For example, FIG. 3 only shows the process of generating a speech waveform for one current phrase, however, in fact, the speech synthesis process may be performed respectively on a plurality of phrases in the text 302 in parallel, so as to synchronously generate a plurality of speech waveforms corresponding to these phrases, and obtain an entire speech waveform corresponding to the text 302 accordingly. Moreover, for example, although the grapheme-to-phoneme converter 314 is adopted in the implementation 300 to convert the current phrase and the phrase context into the corresponding phoneme sequences, in the case that the encoder 320 supports direct processing of a text or graphemes of a text, the grapheme-to-phoneme converter 314 may also be omitted, and the current phrase and the phrase context may be directly provided to the encoder 320. Moreover, although the implementation 300 adopts a Tacotron technique-based network architecture in part, it should be understood that the embodiments of the present disclosure may also be applied to any other types of architecture in a similar approach. Moreover, it should be understood that all or a part of the modules involved in the process 300 may be regarded as constituting an example of the phrase-based end-to-end TTS synthesis system according to the embodiments of the present disclosure.

Figure 4:
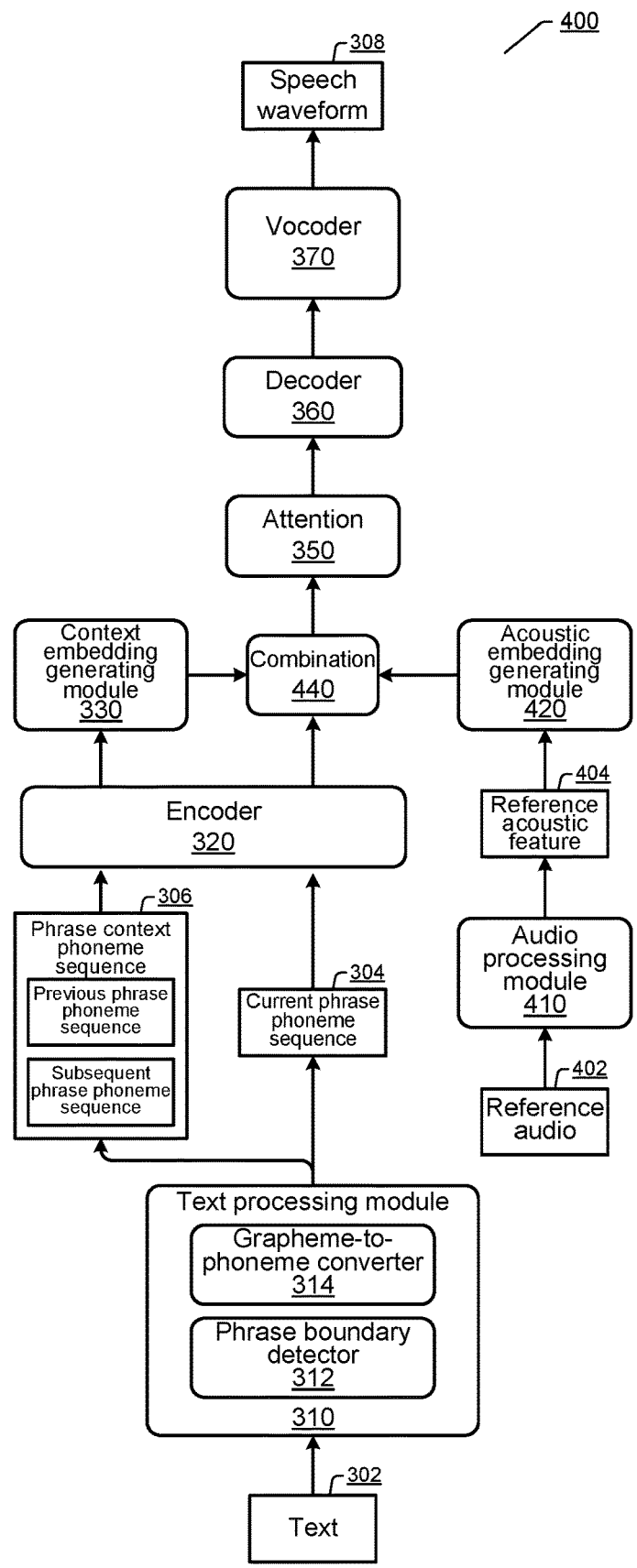
FIG. 4 illustrates an exemplary implementation of phrase-based end-to-end TTS synthesis according to an embodiment.

FIG. 4 illustrates an exemplary implementation 400 of phrase-based end-to-end TTS synthesis according to an embodiment. The implementation 400 is a specific example of the process 200 in FIG. 2, and it may also be regarded as further improvement to the implementation 300 in FIG. 3. In the implementation 400, the speech synthesis further considers a reference audio. The same reference numbers in FIG. 3 and FIG. 4 indicate the same or similar processes or modules.

A reference audio 402 may be obtained. A reference acoustic feature 404 corresponding to the reference audio 402 may be generated through an audio processing module 410. The audio processing module 410 is similar to the audio processing module 220 in FIG. 2.

An acoustic embedding generating module 420 may be used for generating an acoustic embedding representation corresponding to the reference acoustic feature 404. The acoustic embedding representation may be provided to an acoustic model as a condition.

At 440, the acoustic embedding representation output by the acoustic embedding generating module 420, the context embedding representation output by the context embedding generating module 330, and the phrase embedding representation of the current phrase obtained through the encoder 320 may be combined to obtain a combined embedding representation. At 440, any combining approach may be adopted, e.g. concatenating, adding, etc. Optionally, before the combination at 440 is performed, expansion may be performed on the acoustic embedding representation based on the time dimension of the phrase embedding representation of the current phrase in an approach similar to the expansion of the context embedding representation described in conjunction with FIG. 3. Accordingly, at 440, the expanded acoustic embedding representation, the expanded context embedding representation, and the phrase embedding representation of the current phrase may be combined into a combined embedding representation. The combined embedding representation may then be used for subsequent acoustic feature generation.

In the implementation 400, not only prosody control for the generated speech is applied by considering the phrase context, but also style control for the generated speech is applied by considering the reference audio. Moreover, it should be understood that all or a part of the modules involved in the process 400 may be regarded as constituting an example of the phrase-based end-to-end TTS synthesis system according to the embodiments of the present disclosure.

Figure 5:
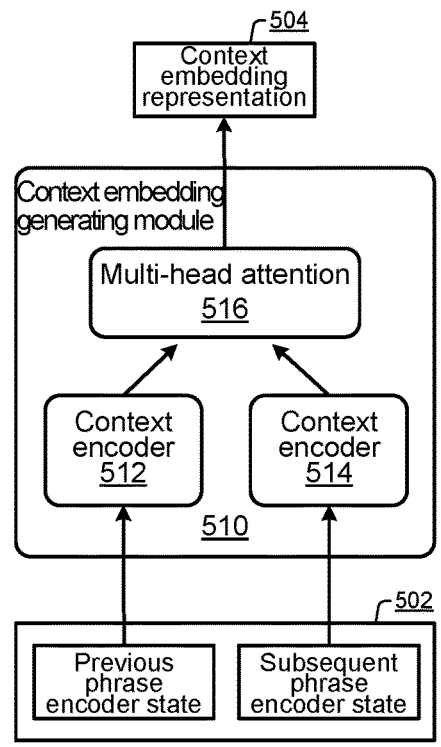
FIG. 5 illustrates an exemplary implementation of a context embedding generating module according to an embodiment.

FIG. 5 illustrates an exemplary implementation of a context embedding generating module 510 according to an embodiment. The context embedding generating module 510 may correspond to the context embedding generating module 330 in FIG. 3 and FIG. 4. The context embedding generating module 510 may generate a context embedding representation 504 based on an encoder state 502 corresponding to a phrase context or a phrase context phoneme sequence.

Exemplarily, FIG. 5 shows that the encoder state 502 includes a previous phrase encoder state and a subsequent phrase encoder state. It should be understood that, depending on whether the phrase context is defined as including the previous phrase or the subsequent phrase or both, the encoder state 502 may also include one or both of the previous phrase encoder state and the subsequent phrase encoder state accordingly.

The context embedding generating module 510 may include a context encoder 512 for further encoding the previous phrase encoder state. For example, the context encoder 512 may include multiple 2-D convolutional layers, a gated recurrent unit (GRU) layer, a full connection layer, a softmax activation function, etc. Since the previous phrase and the subsequent phrase may include different numbers of phonemes, the sequence length or time dimension is variable. The variable sequence length may be mapped to 1 at the GRU layer.

The context embedding generating module 510 may include a context encoder 514 for further encoding the subsequent phrase encoder state. The context encoder 514 may have a structure similar to the context encoder 512.

Outputs of the context encoder 512 and the context encoder 514 may be concatenated, and the obtained concatenated vector may be provided to a multi-head attention module 516 in the context embedding generating module 510. In an implementation, the multi-head attention module 516 may adopt a known token attention layer. At the token attention layer, the concatenated vector is used as a query of the attention. A table of tokens may act as keys and values. The attention mechanism may obtain a weighted sum of tokens according to the similarity of the query to keys. The table of tokens may be randomly initialized and shared across all the training data. The multi-head attention module 516 will output a context embedding representation 504.

It should be understood that the context embedding generating module 510 in FIG. 5 is only exemplary, and the embodiments of the present disclosure may adopt a context embedding generating module having any other structure.

Figure 6:
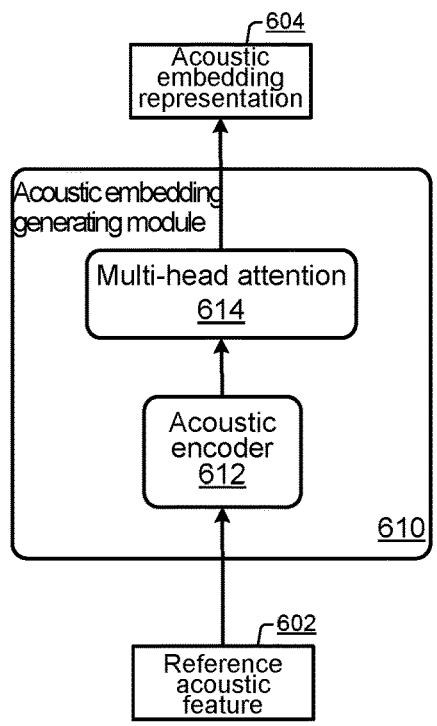
FIG. 6 illustrates an exemplary implementation of an acoustic embedding generating module according to an embodiment.

FIG. 6 illustrates an exemplary implementation of an acoustic embedding generating module 610 according to an embodiment. The acoustic embedding generating module 610 may correspond to the acoustic embedding generating module 420 in FIG. 4. The acoustic embedding generating module 610 may generate an acoustic embedding representation 604 based on a reference acoustic feature 602.

The acoustic embedding generating module 610 may include an acoustic encoder 612 and a multi-head attention module 614. The acoustic encoder 612 and the multi-head attention module 614 may have structures similar to the context encoder 512/514 and the multi-head attention module 516 in FIG. 5, except that their model parameters are trained independently. It should be understood that, in the training phase, the reference acoustic feature 602 may be extracted from an audio corresponding to the current phrase, while in the inferring or application phase, the reference acoustic feature 602 may be extracted from, e.g., the same one reference audio, so as to maintain style stability among phrases in a sentence.

It should be understood that the acoustic embedding generating module 610 in FIG. 6 is only exemplary, and the embodiments of the present disclosure may adopt an acoustic embedding generating module having any other structure.

Figure 7:
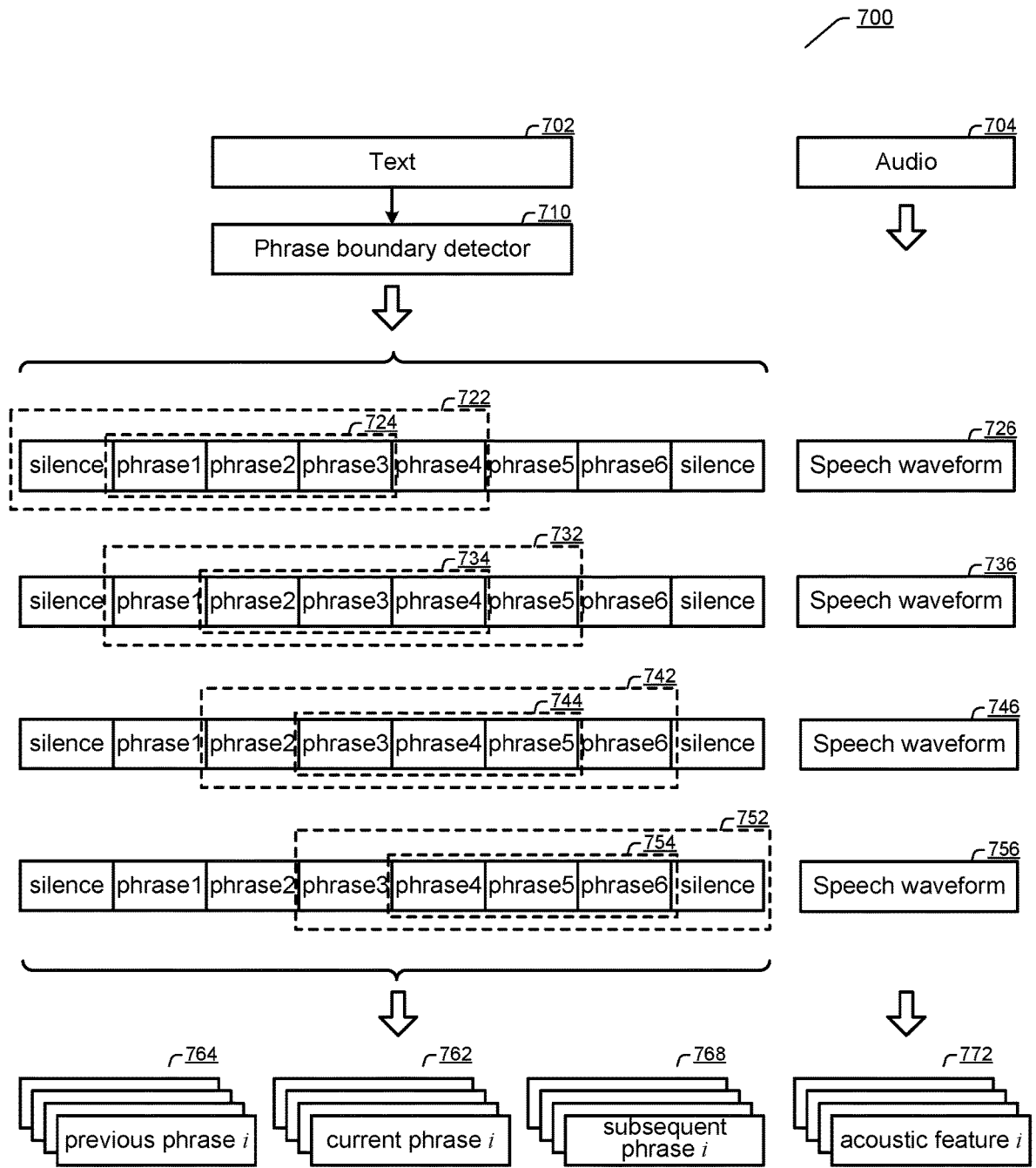
FIG. 7 illustrates an exemplary process for preparing training data according to an embodiment.

FIG. 7 illustrates an exemplary process 700 for preparing training data according to an embodiment.

A data set containing text and audio, e.g., an audio book data set, may be obtained first. It is assumed that a text 702 and a corresponding audio 704 are extracted from the data set. The text 702 may be divided into a plurality of phrase parts through a phrase boundary detector 710, e.g., <phrase 1> to <phrase 6>, and <silence> before phrase 1 and <silence> after phrase 6. Here, a "silence" part is also regarded as a phrase part.

In order to enhance the amount of context information considered in a phrase-level system to facilitate prosody modeling, a sliding window strategy that incorporates multiple phrases may be introduced into the training. K phrases may be treated as the current phrase, M phrases before the K phrases may be treated as a previous phrase, and N phrases after the K phrases may be treated as a subsequent phrase. As an example, in FIG. 7, M and N are set to 1, and K is set to 3 to enhance model robustness. An offset of the sliding window is set to 1. For example, when the sliding window locates at a position 722, the current phrase 724 includes <phrase 1> to <phrase 3>, the previous phrase is <silence> before <phrase 1>, and the subsequent phrase is <phrase 4>. When the sliding window locates at a position 732, the current phrase 734 includes <phrase 2> to <phrase 4>, the previous phrase is <phrase 1>, and the subsequent phrase is <phrase 5>. When the sliding window locates at a position 742, the current phrase 744 includes <phrase 3> to <phrase 5>, the previous phrase is <phrase 2>, and the subsequent phrase is <phrase 6>. When the sliding window locates at a position 752, the current phrase 754 includes <phrase 4> to <phrase 6>, the previous phrase is <phrase 3>, and the subsequent phrase is <silence> after <phrase 6>. It should be understood that M, N and K may also be set to any other values different from the values described above.

When the sliding window locates at a certain position, a segment of speech waveform corresponding to the current phrase may be intercepted from the audio 704 at the same time. For example, when the sliding window locates at the position 722, a speech waveform 726 corresponding to the current phrase 724 may be intercepted from the audio 704. Similarly, a speech waveform 736 corresponding to the current phrase 734, a speech waveform 746 corresponding to the current phrase 744, a speech waveform 756 corresponding to the current phrase 754, etc., may be intercepted from the audio 704. For each speech waveform as described above, a corresponding acoustic feature may be further extracted.

Through the process as described above, a set of data <current phrase i, previous phrase i, subsequent phrase i, acoustic feature i> corresponding to each sliding window position i may be obtained. Accordingly, as the sliding window slides, a current phrase sequence 762, a previous phrase sequence 764, a subsequent phrase sequence 768, and an acoustic feature sequence 772 may be formed. These formed sequences may provide multiple sets of training data for training the phrase-based end-to-end TTS synthesis system according to the embodiments of the present disclosure.

It should be understood that the process 700 only shows an exemplary approach for obtaining training data, and the embodiments of the present disclosure are not limited to the approach of the process 700.

Figure 8:
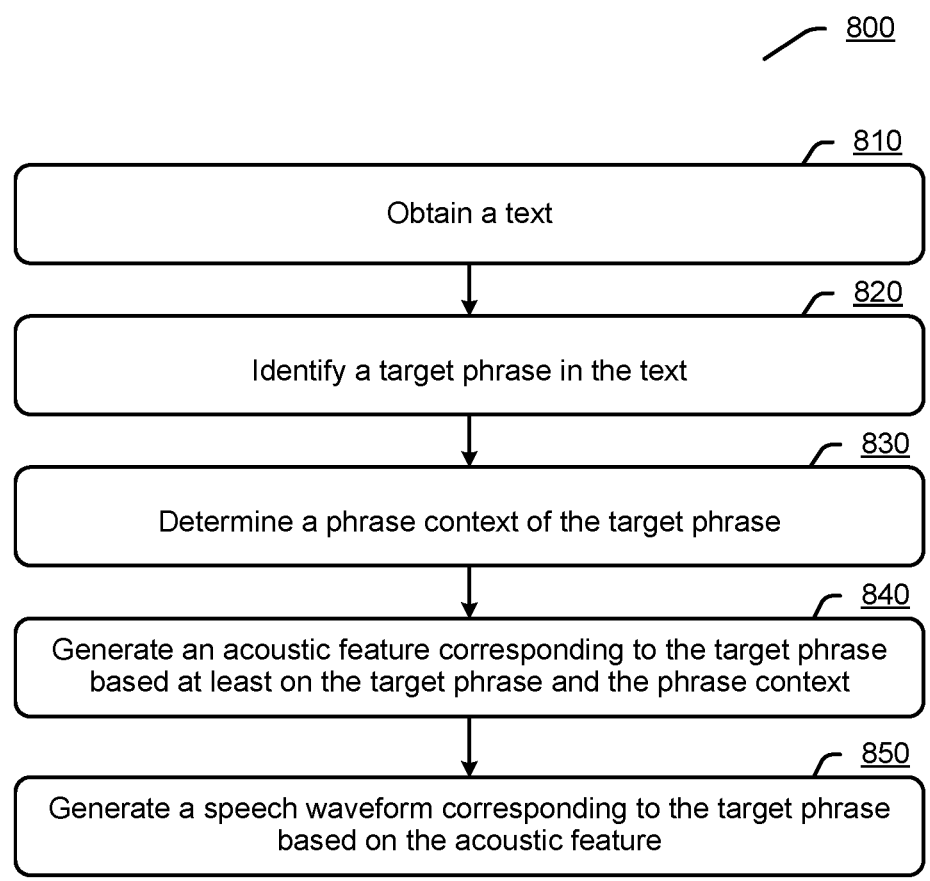
FIG. 8 illustrates a flowchart of an exemplary method for phrase-based end-to-end TTS synthesis according to an embodiment.

FIG. 8 illustrates a flowchart of an exemplary method 800 for phrase-based end-to-end TTS synthesis according to an embodiment.

At 810, a text may be obtained.

At 820, a target phrase in the text may be identified.

At 830, a phrase context of the target phrase may be determined.

At 840, an acoustic feature corresponding to the target phrase may be generated based at least on the target phrase and the phrase context.

At 850, a speech waveform corresponding to the target phrase may be generated based on the acoustic feature.

In an implementation, the identifying a target phrase may comprise: dividing the text into a plurality of phrases through phrase boundary detection; and extracting the target phrase from the plurality of phrases.

In an implementation, the target phrase may comprise at least one phrase.

In an implementation, the phrase context may comprise at least one of: at least one previous phrase adjacent to the target phrase in the text; and at least one subsequent phrase adjacent to the target phrase in the text.

In an implementation, the generating an acoustic feature may comprise:

generating a context embedding representation of the phrase context; and generating the acoustic feature through an acoustic model conditioned by the context embedding representation.

The generating the acoustic feature may comprise: obtaining a combined embedding representation through combining the context embedding representation and a phrase embedding representation of the target phrase; and generating the acoustic feature based on the combined embedding representation.

The obtaining a combined embedding representation may comprise: expanding the context embedding representation based on a time dimension of the phrase embedding representation; and combining the expanded context embedding representation and the phrase embedding representation into the combined embedding representation.

In an implementation, the method 800 may further comprise: obtaining a reference audio. The acoustic feature may be generated further based on the reference audio.

The generating an acoustic feature may comprise: generating a context embedding representation of the phrase context; generating an acoustic embedding representation of the reference audio; and generating the acoustic feature through an acoustic model conditioned by the context embedding representation and the acoustic embedding representation.

The generating the acoustic feature may comprise: obtaining a combined embedding representation through combining the context embedding representation, the acoustic embedding representation, and a phrase embedding representation of the target phrase; and generating the acoustic feature based on the combined embedding representation.

The obtaining a combined embedding representation may comprise: expanding the context embedding representation and the acoustic embedding representation based on a time dimension of the phrase embedding representation; and combining the expanded context embedding representation and acoustic embedding representation and the phrase embedding representation into the combined embedding representation.

In an implementation, the method 800 may further comprise: converting the target phrase into a target phrase phoneme sequence; and converting the phrase context into a phrase context phoneme sequence. The generating an acoustic feature may comprise: generating the acoustic feature based at least on the target phrase phoneme sequence and the phrase context phoneme sequence.

In an implementation, the method 800 may further comprise: identifying a plurality of target phrases in the text; and generating a plurality of speech waveforms corresponding to the plurality of target phrases in parallel.

It should be understood that the method 800 may further comprise any step/process for phrase-based end-to-end TTS synthesis according to the embodiments of the present disclosure as described above.

Figure 9:
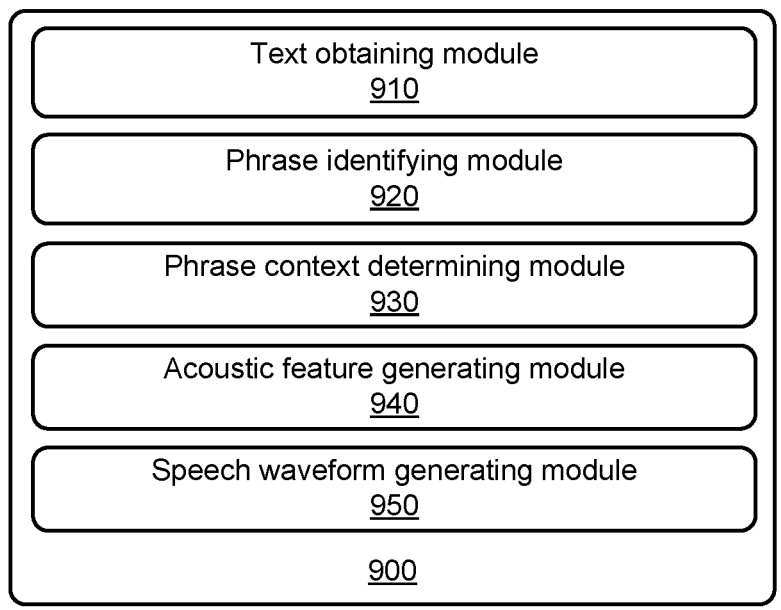
FIG. 9 illustrates an exemplary apparatus for phrase-based end-to-end TTS synthesis according to an embodiment.

FIG. 9 illustrates an exemplary apparatus 900 for phrase-based end-to-end TTS synthesis according to an embodiment.

The apparatus 900 may comprise: a text obtaining module 910, for obtaining a text; a phrase identifying module 920, for identifying a target phrase in the text; a phrase context determining module 930, for determining a phrase context of the target phrase; an acoustic feature generating module 940, for generating an acoustic feature corresponding to the target phrase based at least on the target phrase and the phrase context; and a speech waveform generating module 950, for generating a speech waveform corresponding to the target phrase based on the acoustic feature.

In an implementation, the phrase identifying module 920 may be for: dividing the text into a plurality of phrases through phrase boundary detection; and extracting the target phrase from the plurality of phrases.

In an implementation, the phrase context may comprise at least one of: at least one previous phrase adjacent to the target phrase in the text; and at least one subsequent phrase adjacent to the target phrase in the text.

In an implementation, the acoustic feature generating module 940 may be for: generating a context embedding representation of the phrase context; and generating the acoustic feature through an acoustic model conditioned by the context embedding representation.

In an implementation, the apparatus 900 may further comprise: a reference audio obtaining module, for obtaining a reference audio. The acoustic feature may be generated further based on the reference audio.

The acoustic feature generating module 940 may be for: generating a context embedding representation of the phrase context; generating an acoustic embedding representation of the reference audio; and generating the acoustic feature through an acoustic model conditioned by the context embedding representation and the acoustic embedding representation.

Moreover, the apparatus 900 may further comprise any other module that performs steps of the methods for phrase-based end-to-end TTS synthesis according to the embodiments of the present disclosure as described above.

Figure 10:
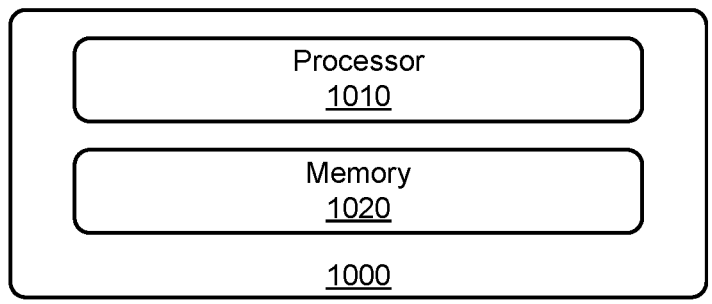
FIG. 10 illustrates an exemplary apparatus for phrase-based end-to-end TTS synthesis according to an embodiment.

FIG. 10 illustrates an exemplary apparatus 1000 for phrase-based end-to-end TTS synthesis according to an embodiment.

The apparatus 1000 may comprise: at least one processor 1010; and a memory 1020 storing computer-executable instructions. The instructions, when executed, cause the at least one processor 1010 to: obtain a text; identify a target phrase in the text; determine a phrase context of the target phrase; generate an acoustic feature corresponding to the target phrase based at least on the target phrase and the phrase context; and generate a speech waveform corresponding to the target phrase based on the acoustic feature. Moreover, the processor 1010 may further perform any other step/process of the methods for phrase-based end-to-end TTS synthesis according to the embodiments of the present disclosure as described above.

The embodiments of the present disclosure may be embodied in a non-transitory computer-readable medium. The non-transitory computer-readable medium may comprise instructions that, when executed, cause one or more processors to perform any operations of the methods for phrase-based end-to-end TTS synthesis according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for phrase-based end-to-end text-to-speech (TTS) synthesis, comprising:
   obtaining a text;
   identifying a target phrase in the text;
   determining a phrase context of the target phrase;
   obtaining a reference audio;
   generating an acoustic feature corresponding to the target phrase based at least on the target phrase, the phrase context and the reference audio, wherein the generating an acoustic feature comprises:
      generating a context embedding representation of the phrase context;
      generating an acoustic embedding representation of the reference audio; and
      generating the acoustic feature through an acoustic model conditioned by the context embedding representation and the acoustic embedding representation; and
   generating a speech waveform corresponding to the target phrase based on the acoustic feature.

2. The method of claim 1, wherein the identifying a target phrase comprises:
   dividing the text into a plurality of phrases through phrase boundary detection; and
   extracting the target phrase from the plurality of phrases.

3. The method of claim 1, wherein
   the target phrase comprises at least one phrase.

4. The method of claim 1, wherein the phrase context comprises at least one of:
   at least one previous phrase adjacent to the target phrase in the text; and
   at least one subsequent phrase adjacent to the target phrase in the text.

5. The method of claim 1, wherein the generating an acoustic feature comprises:
   generating a context embedding representation of the phrase context; and
   generating the acoustic feature through an acoustic model conditioned by the context embedding representation.

6. The method of claim 5, wherein the generating the acoustic feature comprises:
   obtaining a combined embedding representation through combining the context embedding representation and a phrase embedding representation of the target phrase; and
   generating the acoustic feature based on the combined embedding representation.

7. The method of claim 6, wherein the obtaining a combined embedding representation comprises:
expanding the context embedding representation based on a time dimension of the phrase embedding representation; and
combining the expanded context embedding representation and the phrase embedding representation into the combined embedding representation.

8. The method of claim 1, wherein the generating the acoustic feature comprises:
obtaining a combined embedding representation through combining the context embedding representation, the acoustic embedding representation, and a phrase embedding representation of the target phrase; and
generating the acoustic feature based on the combined embedding representation.

9. The method of claim 8, wherein the obtaining a combined embedding representation comprises:
expanding the context embedding representation and the acoustic embedding representation based on a time dimension of the phrase embedding representation; and
combining the expanded context embedding representation and acoustic embedding representation and the phrase embedding representation into the combined embedding representation.

10. The method of claim 1, further comprising:
converting the target phrase into a target phrase phoneme sequence; and
converting the phrase context into a phrase context phoneme sequence, and
wherein the generating an acoustic feature comprises:
generating the acoustic feature based at least on the target phrase phoneme sequence and the phrase context phoneme sequence.

11. The method of claim 1, further comprising:
identifying a plurality of target phrases in the text; and
generating a plurality of speech waveforms corresponding to the plurality of target phrases in parallel.

12. An apparatus for phrase-based end-to-end text-to-speech (TTS) synthesis, comprising:
a text obtaining module, for obtaining a text;
a phrase identifying module, for identifying a target phrase in the text;
a phrase context determining module, for determining a phrase context of the target phrase;
an audio obtaining module, for obtaining a reference audio;
an acoustic feature generating module, for generating an acoustic feature corresponding to the target phrase based at least on the target phrase, the phrase context and the obtained reference audio, wherein the acoustic feature is generated based on the reference audio, a context embedding representation of the phrase context, an acoustic embedding representation of the reference audio; and wherein the acoustic feature is conditioned by the context embedding representation and the acoustic embedding representation when passed through the acoustic feature generating module; and
a speech waveform generating module, for generating a speech waveform corresponding to the target phrase based on the acoustic feature.

13. An apparatus for phrase-based end-to-end text-to-speech (TTS) synthesis, comprising:
at least one processor; and
a memory storing computer-executable instructions that, when executed, cause the at least one processor to:
obtain a text,
identify a target phrase in the text,
determine a phrase context of the target phrase,
obtaining a reference audio,
generate an acoustic feature corresponding to the target phrase based at least on the target phrase, the phrase context, and an obtained reference audio, wherein the generated acoustic feature comprises a generated a context embedding representation of the phrase context and a generated an acoustic embedding representation of the reference audio, wherein the generated acoustic feature is passed through an acoustic model conditioned by the context embedding representation and the acoustic embedding representation; and
generate a speech waveform corresponding to the target phrase based on the acoustic feature.

* * * * *